(12) United States Patent
Amidzich

(10) Patent No.: US 6,874,521 B1
(45) Date of Patent: Apr. 5, 2005

(54) HIGH TO LOW GAS FLOW REGULATOR

(75) Inventor: Bradford G. Amidzich, Oconomowoc, WI (US)

(73) Assignee: Vent-Matic Company, Inc., Wauwatosa, WI (US)

(*) Notice: Subject to any disclaimer, the term of this patent is extended or adjusted under 35 U.S.C. 154(b) by 46 days.

(21) Appl. No.: 10/130,334
(22) PCT Filed: Nov. 10, 2000
(86) PCT No.: PCT/US00/30937
§ 371 (c)(1), (2), (4) Date: May 10, 2002
(87) PCT Pub. No.: WO01/35180
PCT Pub. Date: May 17, 2001

Related U.S. Application Data
(60) Provisional application No. 60/165,893, filed on Nov. 12, 1999.

(51) Int. Cl.[7] ............................................. G05D 16/02
(52) U.S. Cl. ................ 137/12; 137/505.18; 137/505.41
(58) Field of Search ....................... 137/12, 14, 505.18, 137/505.28, 505.41

(56) References Cited

U.S. PATENT DOCUMENTS

| | | | |
|---|---|---|---|
| 3,654,948 A | * | 4/1972 | Nelson .................. 137/118.07 |
| 4,424,830 A | * | 1/1984 | Arnsperger et al. ......... 137/613 |
| 4,516,600 A | | 5/1985 | Sturman et al. ............ 137/495 |
| 4,718,448 A | * | 1/1988 | Love et al. ................. 137/271 |
| 5,238,021 A | | 8/1993 | Powell et al. .......... 137/505.18 |
| 5,285,810 A | | 2/1994 | Gotthelf ...................... 137/340 |
| 5,354,530 A | | 10/1994 | Atkinson et al. ............ 264/219 |
| 5,499,648 A | | 3/1996 | Powell et al. ................. 137/15 |
| 5,555,910 A | | 9/1996 | Powell et al. ............... 137/488 |
| 5,595,209 A | | 1/1997 | Atkinson et al. ........ 137/116.5 |
| 5,661,278 A | | 8/1997 | Atkinson et al. ............. 200/83 |
| 5,931,188 A | | 8/1999 | Sprague .................. 137/505.18 |
| 5,992,449 A | | 11/1999 | Sprague ...................... 137/488 |
| 6,101,816 A | | 8/2000 | Wang et al. ................. 62/48.1 |

FOREIGN PATENT DOCUMENTS

DE 500790 6/1930 ............ 137/505.18

* cited by examiner

Primary Examiner—Stephen M. Hepperle
(74) Attorney, Agent, or Firm—Boyle Fredrickson Newholm Stein & Gratz S.C.

(57) ABSTRACT

A diaphragm operated regulator valve usable, e.g., for maintaining a preset gas pressure in a potable storage container, provides particularly effective at gas flow regulation as well as pressure regulation. The use of the word "fluid" as used herein can encompass both liquids and gasses. The valve includes a gas-balanced piston-tower diaphragm assembly that is freely supported, sealed, and operatively connected to a pressure-biasing adjustment. The diaphragm assembly permits axial movement relationships between valving channels or pathways, a valving-seal, and volume changes that take place in a low-pressure chamber. The valve 1) converts axial movement of the diaphragm into smooth transitional flow rates by varying the cross sectional areas of ingress and egress from an open valve position to a closed valve position and 2) has the ability to preset maximum flow rates.

10 Claims, 9 Drawing Sheets

FIG. 9A Valve Open

FIG. 8A Valve Mid Position

FIG. 7A Valve Closed

US 6,874,521 B1

HIGH TO LOW GAS FLOW REGULATOR

CROSS REFERENCE TO A RELATED APPLICATION

This application claims the benefit of the filing date of the earlier U.S. Provisional Patent App. Ser. No. 60/165,893, filed Nov. 12, 1999 an titled High to Low Gas Flow Regulator.

BACKGROUND OF THE INVENTION

1. Field of the Invention

This invention relates to a regulator valve for maintaining a designated gas pressure at an output thereof, and more particularly to a regulator valve that maintains a preset gas pressure and a set maximum flow rate in a device such as a transportable container for potable liquids.

3. Discussion of the Related Art

Diaphragm operated regulator valves have been utilized to regulate the flow of compressed gas applied to a gas layer on top of liquids in a storage container and to other low pressure applications. The gas is normally a non-flammable gas, such as carbon dioxide and/or nitrogen. One such regulator valve is disclosed in U.S. Pat. No. 5,238,021, dated Aug. 24, 1993. In this valve, pressure flow is regulated via a diaphragm actuator. The diaphragm actuator is 1) relatively large, 2) very costly to manufacture, and 3) unsuitable in some applications of portable storage container operations. In addition, because regulator valves of this general type are no more than a poppet valve with a control spring, they cannot be changed to different flow rates without being re-manufactured. They also move open abruptly from a fully losed position to a fully-open position and, therefore, cannot transition smoothly from a closed position to an open position and cannot achieve a flow rate therethrough that is proportional to the amount of valve opening.

OBJECTS AND SUMMARY OF THE INVENTION

In accordance with the first aspect of the invention, a diaphragm operated regulator valve for maintaining a preset gas pressure in a potable storage container is provided with a relatively small diameter diaphragm and provides particularly effective at gas flow regulation as well as pressure regulation. The use of the word "fluid" as used herein can encompass both liquids and gasses.

The regulator valve is usable, e.g., as a potable fluid regulator valve rated at low fluid pressures. The valve includes a gas-balanced piston-tower diaphragm assembly that is freely supported, sealed, and operatively connected to a pressure-biasing adjustment. The diaphragm assembly permits axial movement relationships between valving channels or pathways, a valving-seal, and volume changes that take place in a low-pressure chamber. The valve 1) converts axial movement of the diaphragm into smooth transitional flow rates by varying the cross sectional areas of ingress and egress from an open valve position to a closed valve position and 2) has the ability to preset maximum flow rates.

The axial movement and sealing of valving channels exposed to fluid pressure occurs generally as disclosed in, U.S. Pat. No. 5,645,192 and U.S. Pat. No. 6,109,485, both of which are incorporated by reference in their entirety. This axial movement is the most important parameter in determining the sensitivity or responsiveness of the regulator valve to pressure changes. The valving channels or pathways are configured to cooperate with the associated valve seat so as to provide a smooth transition of gas flow between open and closed positions of the valve.

The regulator valve is very small in size (typically about 1 in. by 2 in. in diameter) and can provide regulated outlet-pressures as low as 1 psi at inlet-pressures above 2000 psi. By making use of threaded housings, fewer parts are required, and sub-assemblies can be used to improve automation of assembly and cost effectiveness.

Other features and advantages of the invention will be apparent from following drawings and graphs.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
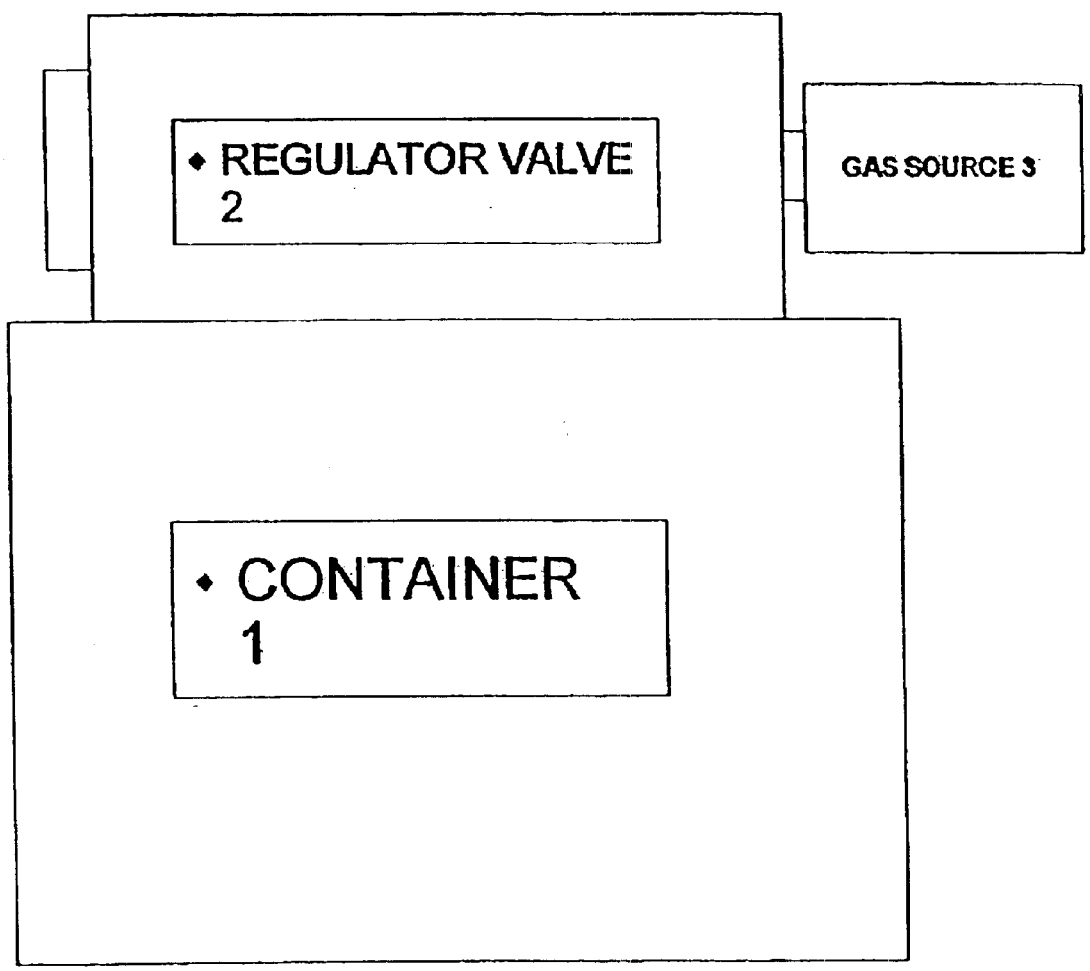
FIG. 1 schematically illustrates a typical dispenser in which a regulator valve constructed in accordance with the present invention may be used.

Referring now to the drawings for a better understanding of the invention, and more particularly to FIG. 1, a dispensing storage container for liquids is shown generally at 1 and stores a potable liquid under a pressurized gas blanket or layer contained therein. A gas suitable for dispensing the liquid from the container may be carbon dioxide or some other non-flammable gas such as nitrogen. The gas is supplied by a source 3 that may, for instance, comprise a commercially available $CO_2$ cartridge. The pressure in the container 1 is controlled by a pressure regulator valve shown generally at 2. The valve 2 is placed between the dispensing container 1 and the source of pressurized gas. The container 1 may comprise, e.g., a keg configured to dispense a beverage. It should be understood that the same valve 2 and other valves constructed in accordance with the present invention can be used in a variety of other applications including the dispensing of medicinal products, the dispensing of non-potable liquids, and any other application requiring the dispensing of a liquid or gas at a designated rate and/or a designated pressure.

Figure 2:
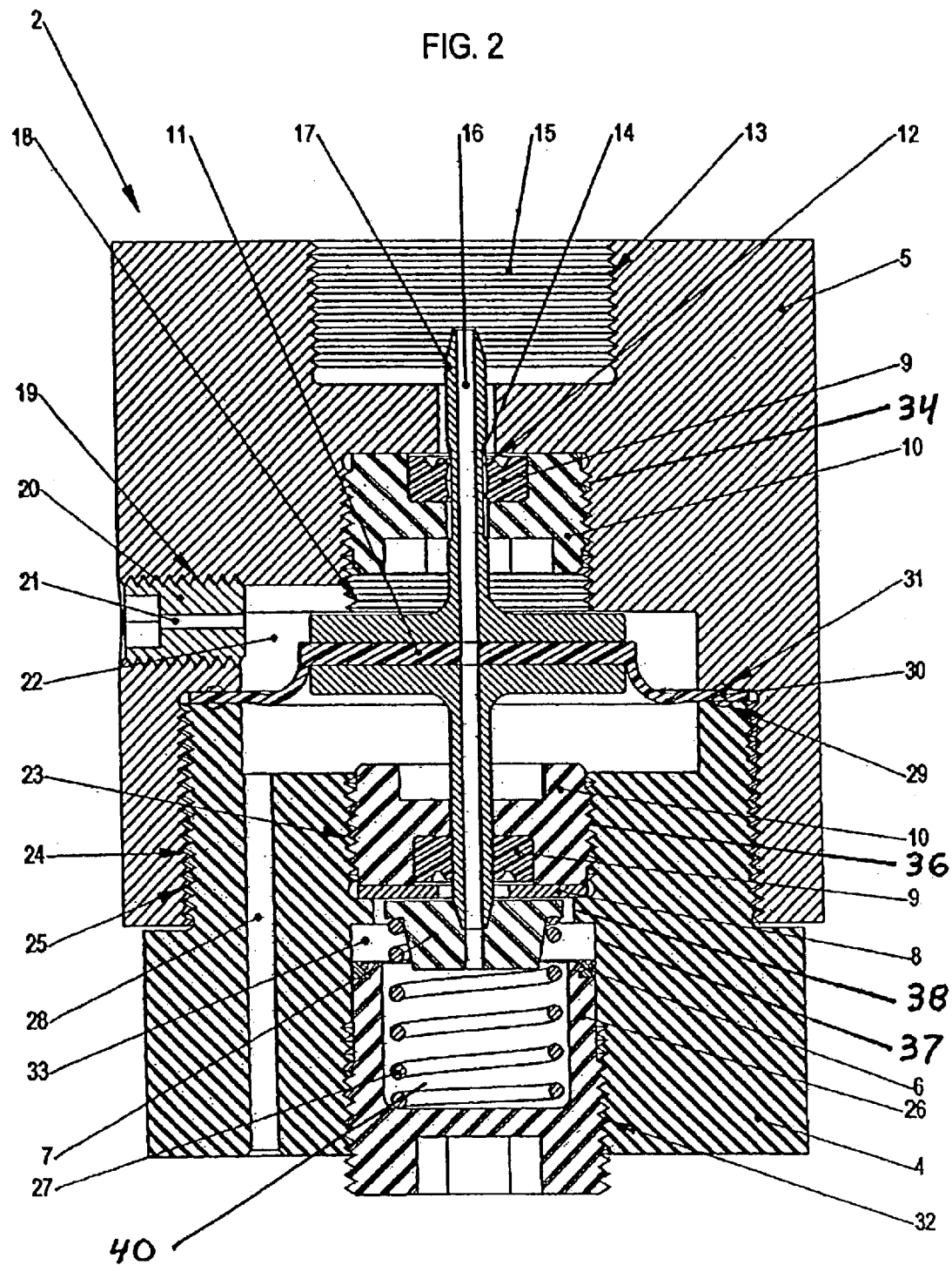
FIG. 2 is a sectional side elevation view illustrating the gas regulator valve of FIG. 1 as a complete assembly.

Referring to FIG. 2, the valve 2 is formed from first, second, and third main units that are attached to one another to form a completed assembly in which a high pressure chamber 15 and a balance control chamber 33 are disposed at opposite ends of the valve 2 with a low pressure chamber 22 formed therebetween. The high pressure chamber 15 is connected to the high pressure source 3 via a hose or line connected to a threaded inlet 13, and the low pressure chamber 22 is connected to dispensing container 1 either by direct communication or an intervening line or hose. All or nearly all valve components preferably are made of a plastic or another engineered polymer such as Polysulfone®.

Figure 3:
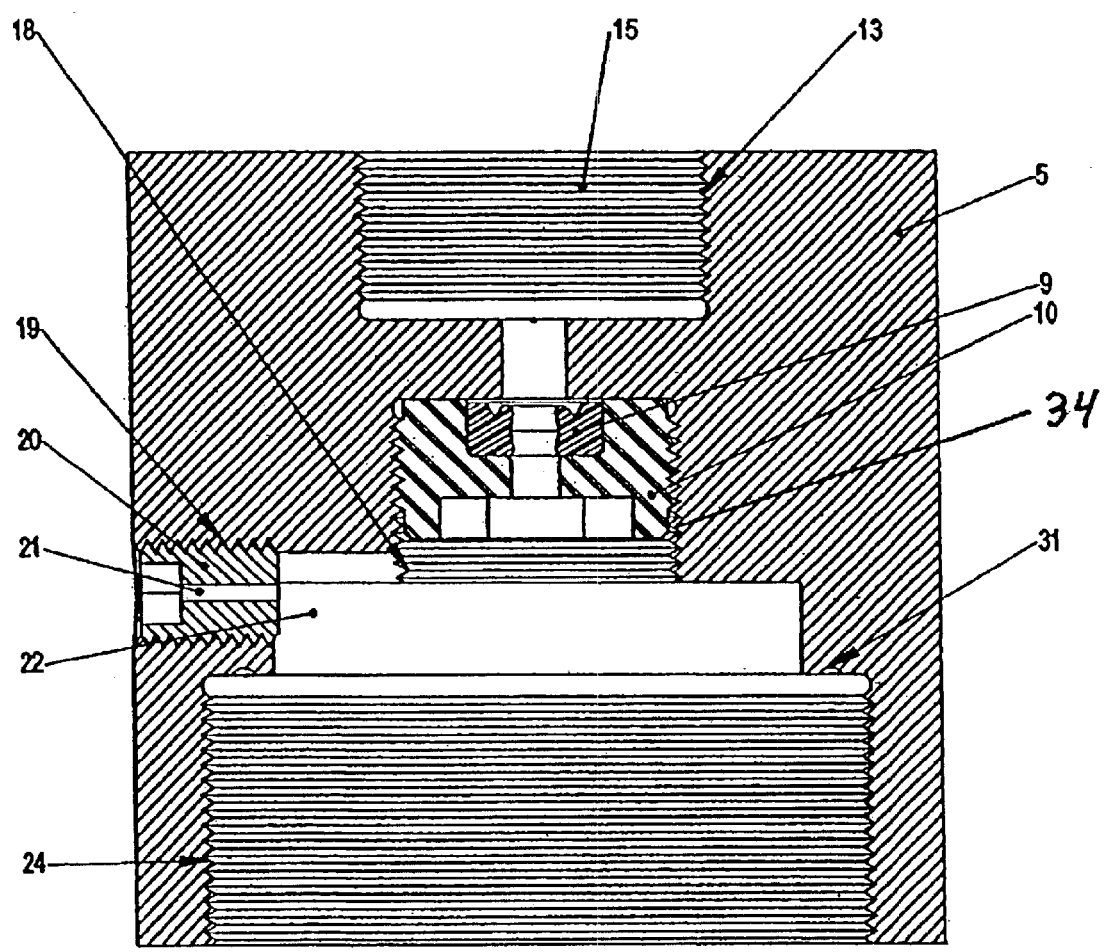
FIG. 3 is a sectional side elevation view illustrating one of the three units that make up the regulator valve.

Referring to FIG. 3, the first unit of the valve 2 includes a first housing 5 and a sub-assembly 9, 10 screwed into threads 18 formed on the inner diameter of a bore formed in a generally central portion of the housing 5. The sub-assembly 9, 10 includes 1) a seal holder 10 threaded into a bore 34 in the housing 5 and 2) a seal 9. The seal 9 has a plastic overlay and an elastomeric lip seal which is of the type disclosed in U.S. Pat. No. 5,645,192 and U.S. Pat. No. 6,109,485. The seal 9 functions as a valve seat to seal-off high pressure chamber 15 and high pressure source 3 from low pressure chamber 22 and container 1. A replaceable flow-rate outlet orifice part 20 is screwed into low-pressure outlet threads formed in a radial bore 19 opening into the low pressure chamber 22. The replaceable flow-rate outlet orifice part 20 can house any of a variety of different orifices 21 that set the rate of flow out of the low-pressure chamber 22 at a desired value.

Figure 4:
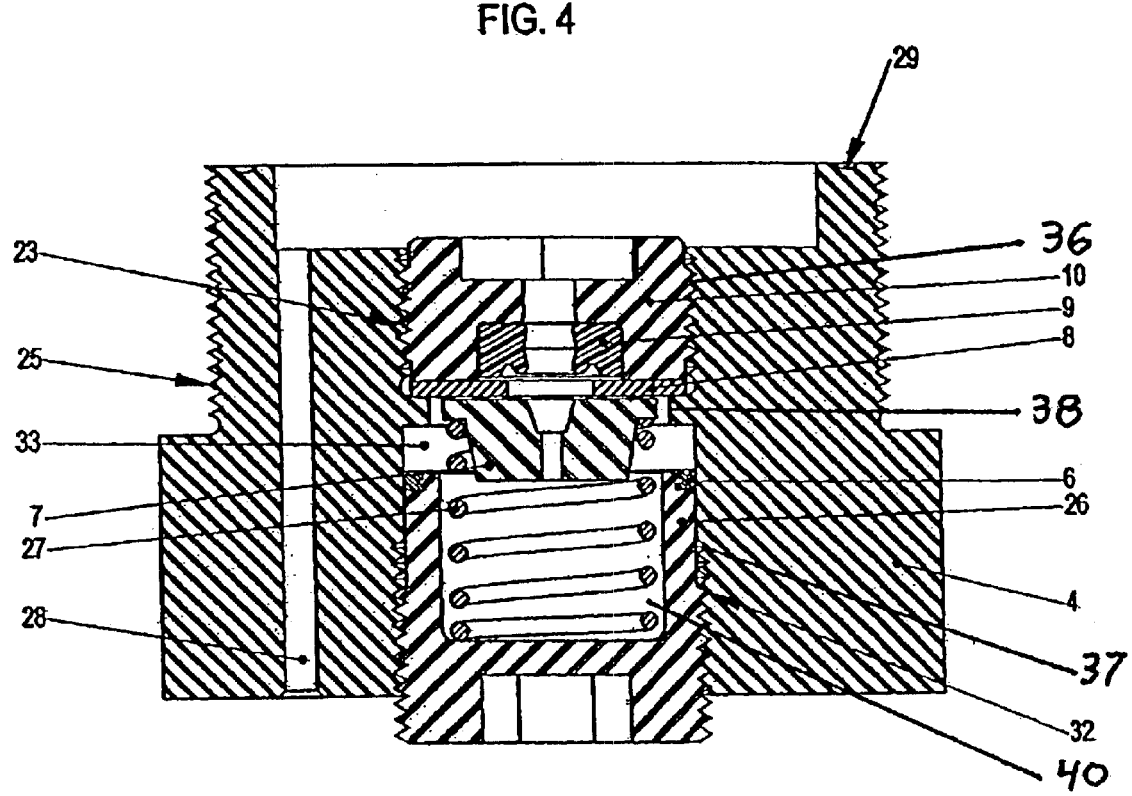
FIG. 4 is a sectional side elevation view illustrating another of the three units that make up the regulator valve.

Referring to FIG. 4, the second unit of the valve 2 includes a second housing 4 having a sub-assembly 9, 10 mounted in a stepped bore 32 formed in the housing 4. The bore 32 has an upper portion 23 and a lower portion 37 separated by a flange 38. The sub-assembly 9, 10 is faced with a keeper disk part 8 screwed into threads 23 in the inner end of the upper portion 23, which forms the inner end of a balance control chamber 340 of the valve 2. The sub-assembly 9–10 is identical to the corresponding sub-assembly of the first unit, hence permitting the use of interchangeable parts in the first two units. Another sub-assembly 6–26 of the second valve unit faces a sub-assemble 7–27 screwed into threads in the outer end 37 of the balance control chamber 33. The sub-assembly 6–26 is formed from a cap seal 6 and an adjustment cap 26 threaded into the bottom end 37 of the bore 32, and sub-assembly 7–27 is formed from a bias spring cap 7 and bias pressure spring 27 which biases the second unit towards the valve-open position.

Figure 5:
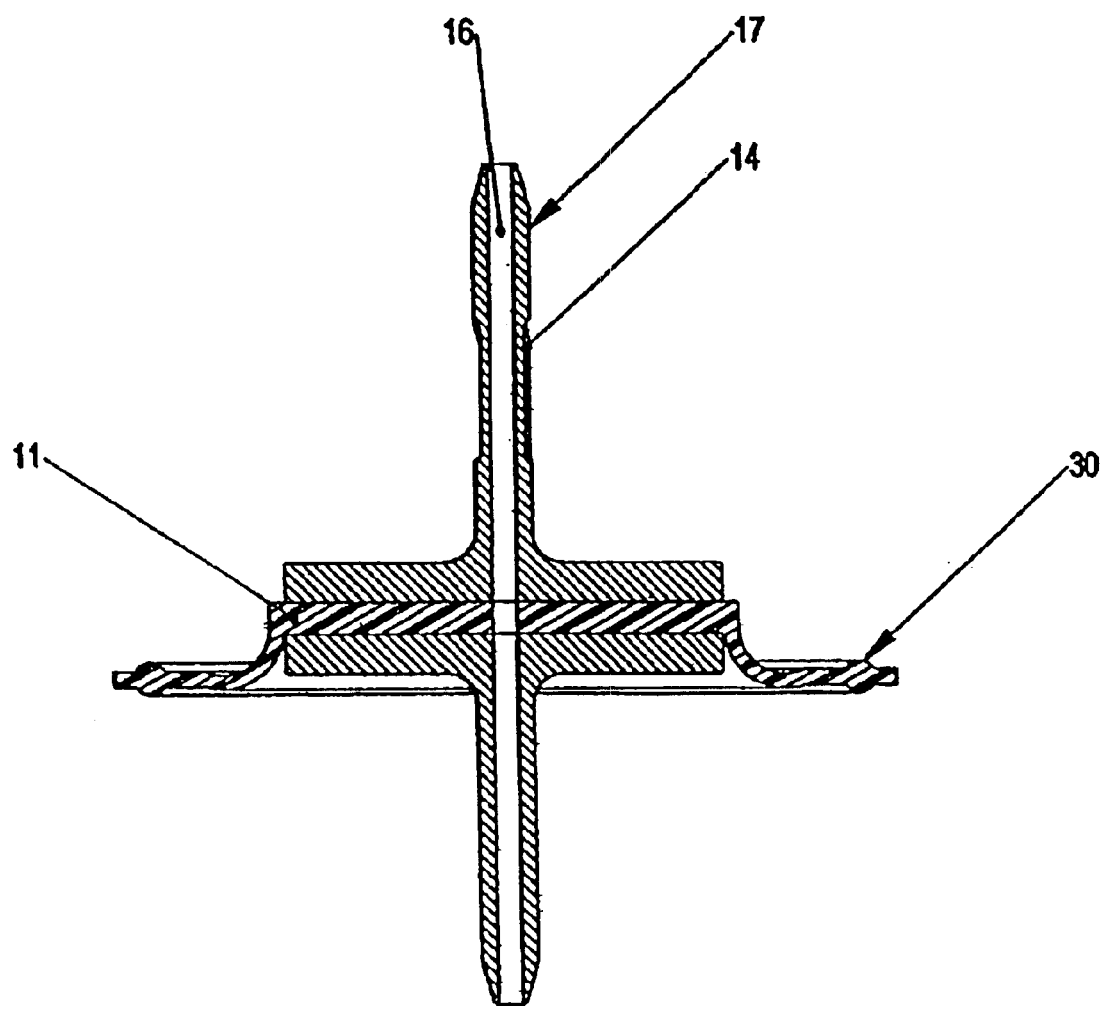
FIG. 5 is a sectional side elevation view illustrating still another of the three units that make up the regulating valve.

Referring to FIG. 5, the third unit comprises a sub-assembly 11–17 extending through the low pressure chamber 22 and into the high pressure chamber 15 and the balance control chamber 40. The sub-assembly 11–17 comprises a diaphragm 11 and a rod tower 17 that together, form a gas-balanced piston-tower valve part. The diaphragm 11 is bonded to rod tower 17 and has 1) an O-ring 30 portion formed or otherwise provided therein. The rod tower 17 has an internal passage 16 formed therethrough end 2 a plurality of external graduated pathways 14 that selectively permit a controlled flow of high pressure fluid into the low pressure chamber 22 from the high pressure chamber 15 as detailed below. The pathways 14 are formed from a plurality of peripherally-spaced grooves formed in the exterior surface of the rod tower. The depth of the upper end of each pathway 14 is tapered to provide smooth opening and flow rate control as detailed below.

Figure 6:
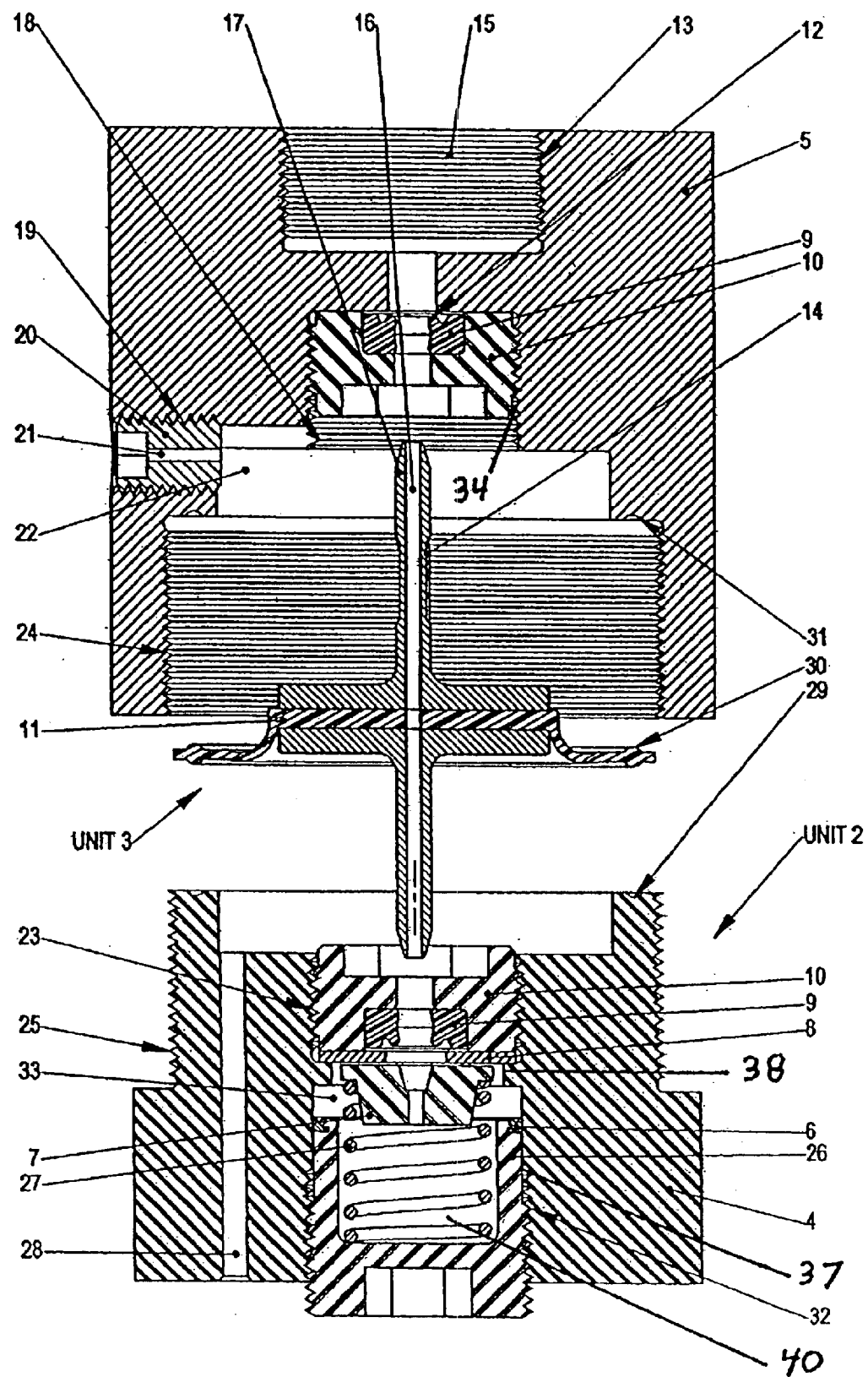
FIG. 6 is a partially exploded sectional side elevation view of the three units that make up the regulating valve.
Figure 9B:
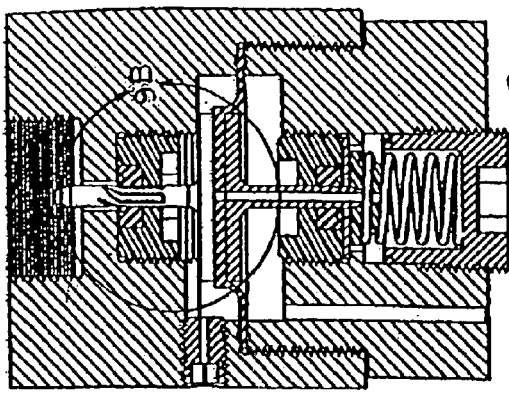
FIGS. 9 and 9A are a collection of sectional side elevation views of a portion of the regulator valve in its full-open position.
Figure 9B:
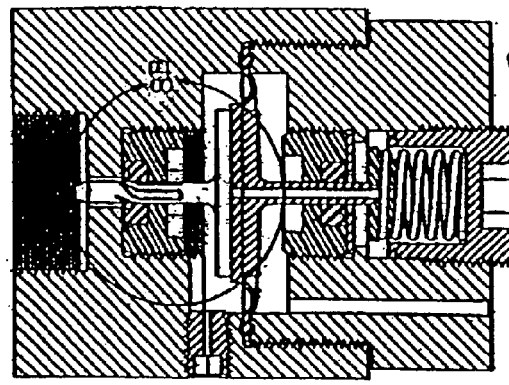
Figure 9B:
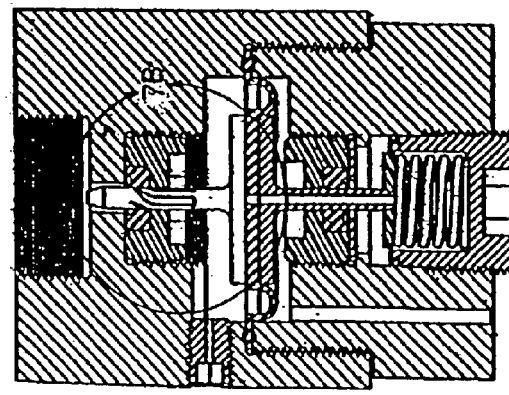
Figure 9B:
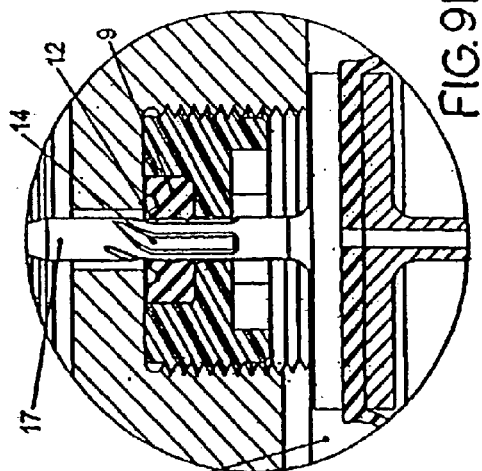
Figure 8B:
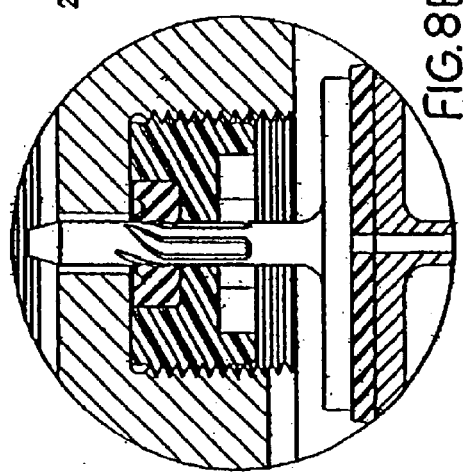
FIGS. 8 and 8A are sectional side elevation views of a portion of the regulator valve its half-open position.
Figure 7B:
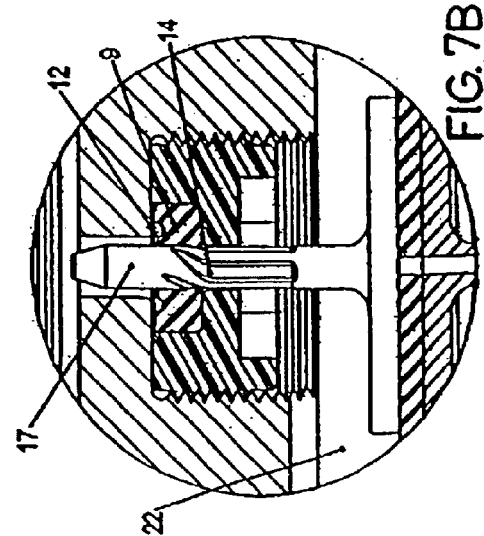
FIGS. 7 and 7A are a collection of sectional side elevation views of a portion of the regulator valve in its fully-closed position.
Figure 10:
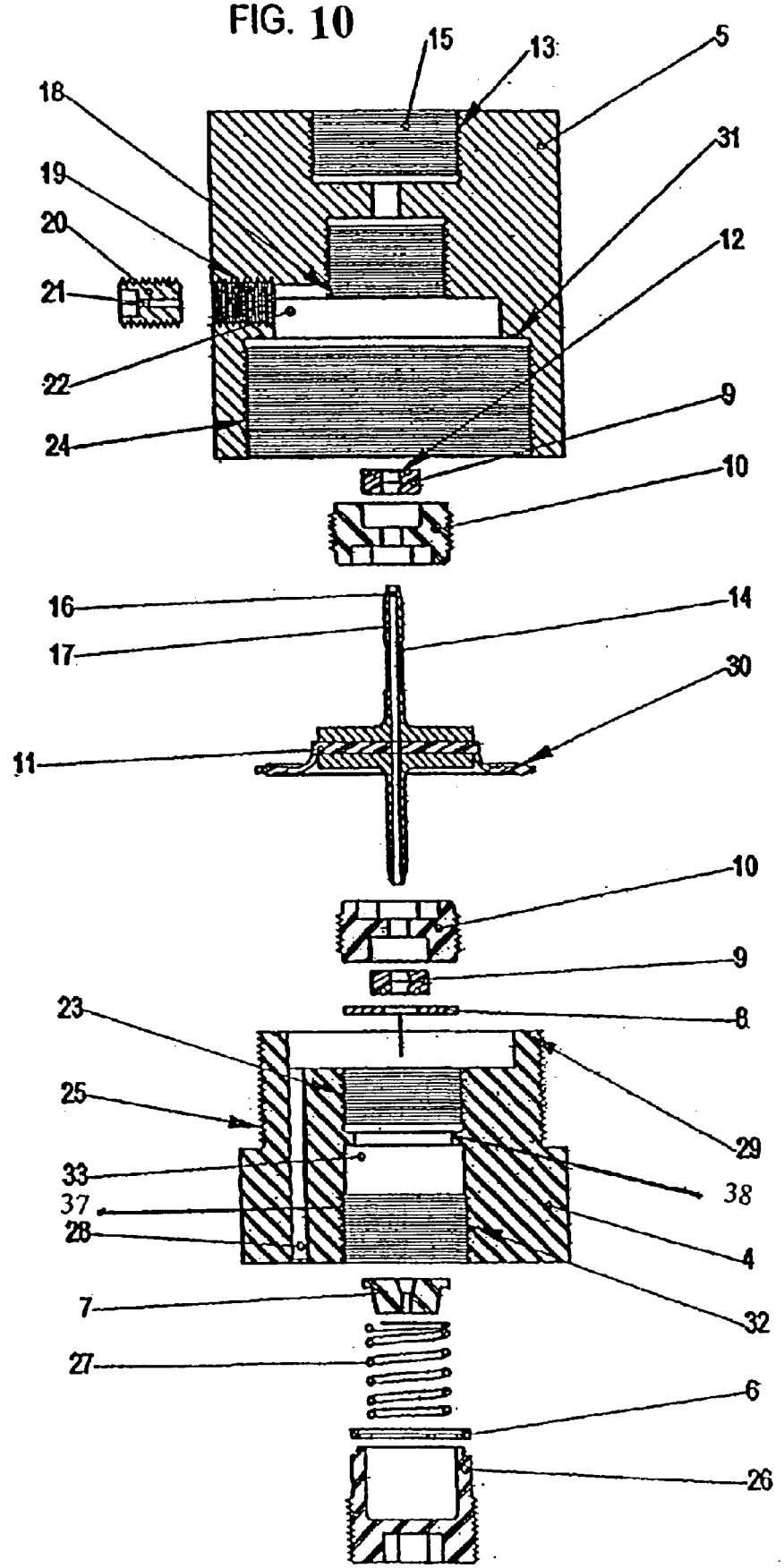
FIG. 10 is an exploded side elevation view of the regulator valve.

The diaphragm 11 is clamped between the first and second housing 4 and 5 of the first and second units seal the low pressure chamber 22 from the balance control chamber 33. More specifically, referring to FIG. 6, the orientation of the third unit between the second unit and the first unit allows the capture and confinement of O-ring portion 30 of diaphragm 11 between sealing grooves 31 and 29, respectively, by screwing the female thread 24 on the first housing 5 to the male thread 25 on the second housing 4. This orientation of the third unit requires the upper end of rod tower 17 to pierce through the seal 9 of the first unit into the high pressure 15 and the lower end of the rod tower 17 to pierce through the seal of 9 of the second unit into the balance control chamber 33.

Operation

Referring again to FIG. 2, upon coupling the pressurized gas from source 3 to the high high pressure chamber 15, gas flow will bifurcate at the upper end of rod tower 17 via the internal passage 16 and the external pathways 14. The gas passing through passage 16 places the balance control chamber 33 in constant fluid communication with the high pressure chamber 15, thereby negating any high-pressure thrust force differential at the ends of rod tower 17. With little or no high-pressure thrust present on rod tower 17, the bias force of the spring 27 will have connective control over the free axial movement of a gas-balanced piston-tower valve part 11–17 of the third unit against the volume change of low-pressure chamber 22. The gas passing through the external pathways 14 will flow past the rod tower 17, into low pressure chamber 22, and into the container 1.

FIGS. 7B-9C collectively show the volume change of the exposed areas of the pathways 14 from open to mid to close. Detail view 9B shows the valving-seat cross section of seal 9 at sealing-lip 12 and one quarter of whole valving pathway 14 of rod tower 17 when the valve 2 is in its rest or full open position. As gas migrates past sealing lip 12, through pathways 14, and into low-pressure chamber 22, gas pressure in low pressure chamber 22 rises against confinement and forces diaphragm 11 to impart downward axial movement onto rod tower 17. This axial movement will begin to close off gas-flow from the source 3 by moving the rod tower 17 downwardly to a position in which only the upper tapered ends of the pathways 14 extend past the sealing lip 12. Detail view 8B shows the mid point of this closure, and detail view 7B shows full gas cut-off which occurs when the sealing lip 12 seals against the rod tower 17 above the pathways 14. The reduced gas flow rate by movement of the rod tower 17 and consequent reduction of pathway inlet area achieves balance of the preset pressure in container 1 and cuts off gas-flow from the pressurized source 3.

The rate of gas flow into the low pressure chamber 22 is controlled by the shape of the pathways 14, and numerous rates of flow can therefore be defined with a gradual and progressive widening and deepening of this shape along the length of the rod tower as the rod tower 17 seals to lip 12 from full open to close. The gas flow rate variation with rod tower movement is very smooth and sensitive as compared to a standard pop open/pop-close valve.

Figure 11:
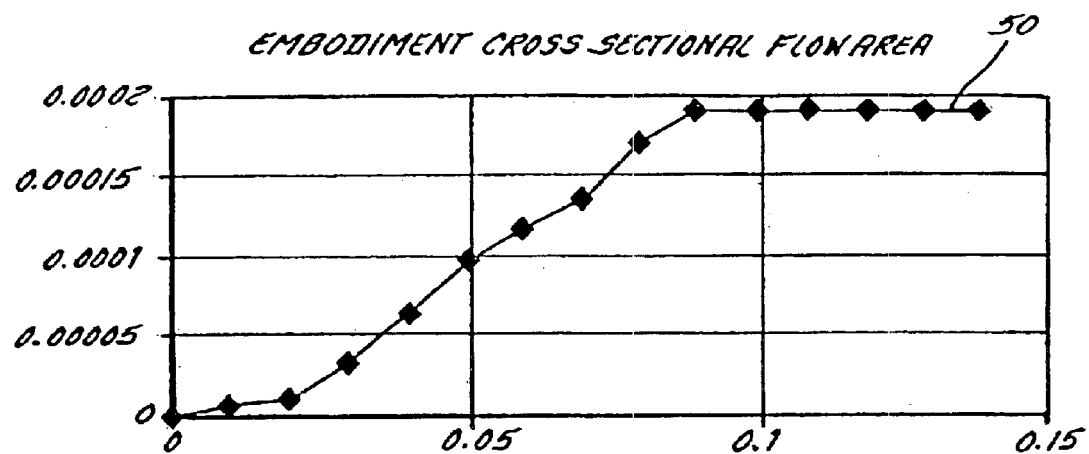
FIGS. 11 and 12 are a pair of graphs comparing operation of a regulator valve constructed in accordance with the invention to that of a prior art regulator valve
Figure 12:
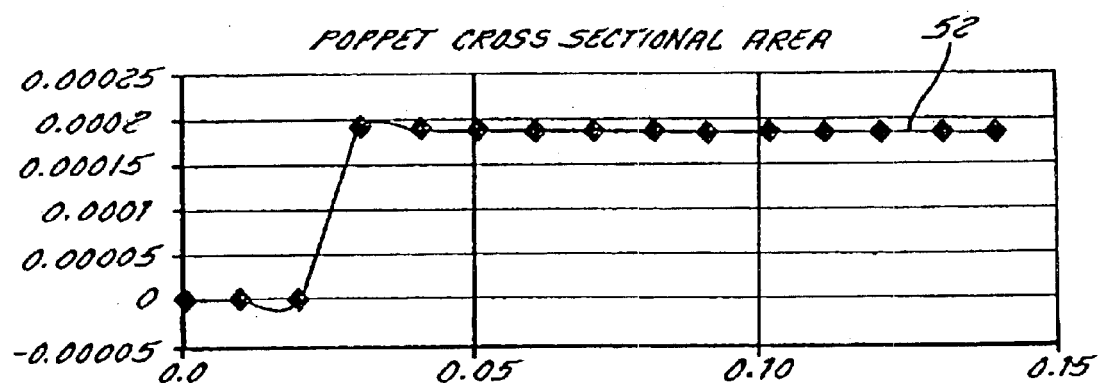

The graphs of FIGS. 11 and 12 show the relationship of gas-flow of the illustrated embodiment of the invention curve 50 in. (FIG. 11) as compared to a standard regulator employing a poppet valve curve 52 in. (FIG. 12). The operating curves are plotted using cross sectional square area ($in^2$) of exposed gas pathway found at a given axial stroke of valve element movement in (thousands of an inch)

as the valve opens and closes. The curve 50 of FIG. 11, illustrating operation of the embodiment of the invention described above, is smooth and gradual, showing that flow rates vary gradually with stroke. The curve 52 of FIG. 12, illustrating operation of a standard poppet valve seat, is very sharp because the valve is either fully open or fully closed. The data plotted by these cures is reproduced by the following tables:

TABLE 1

FLOW CHARACTERISTICS OF REGULATOR WITH INVENTIVE VALVE

| Rod tower stroke distance (in) | Pathway cross sectional flow area (in$^2$) |
|---|---|
| 0.14 | 0.000188 |
| 0.13 | 0.000188 |
| 0.12 | 0.000188 |
| 0.11 | 0.000188 |
| 0.1 | 0.000188 |
| 0.09 | 0.000188 |
| 0.08 | 0.000169 |
| 0.07 | 0.000134 |
| 0.06 | 0.000115 |
| 0.05 | 0.000096 |
| 0.04 | 0.000063 |
| 0.03 | 0.0000321 |
| 0.02 | 0.0000104 |
| 0.01 | 0.0000054 |
| 0 | 0 |

TABLE 2

FLOW CHARACTERISTICS OF REGULATOR WITH POPPET VALVE

| Rod tower stroke distance (in) | Pathway cross sectional flow area (in$^2$) |
|---|---|
| 0.14 | 0.000188 |
| 0.12 | 0.000188 |
| 0.11 | 0.000188 |
| 0.1 | 0.000188 |
| 0.09 | 0.000188 |
| 0.08 | 0.000188 |
| 0.07 | 0.000188 |
| 0.06 | 0.000188 |
| 0.05 | 0.000188 |
| 0.04 | 0.000188 |
| 0.03 | 0.000188 |
| 0.02 | 0 |
| 0.01 | 0 |
| 0 | 0 |

While a preferred embodiment of the present invention has been illustrated in detail, it is apparent that modifications and adaptations of the preferred embodiment will occur to those skilled in the art, and it is to be expressly understood that such modifications and adaptions of the preferred embodiment will occur to those skilled in the art. However, it is to be expressly understood that such modifications and adaptations are within the spirit and scope of the present invention as set forth in the following claims.

I claim:

1. A regulating valve as comprising
   (A) a housing which has a high pressure chamber and a low pressure chamber formed therein;
   (B) a valve seat which is disposed in said housing between said high pressure chamber and said low pressure chamber; and
   (C) a valve element which is disposed in said housing and which is selectively movable, upon a pressure drop in said low pressure chamber beneath a designated pressure through a valve opening stroke extending between 1) a fully closed position in which said valve element seals against said valve seat to prevent fluid flow from said high pressure chamber to said low pressure chamber, and 2) a fully open position in which a maximum inlet flow area of said valve element is open to permit fluid to flow from said high pressure chamber to said low pressure chamber at a maximum rate, and
   wherein said inlet flow area of said valve element increases continuously for at least a substantial portion of the opening stroke of said valve element so that the rate of fluid flow through said valve increases throughout said substantial portion of the valve element stroke,
   wherein, during the valve opening stroke, a flow rate from said high pressure chamber to said lower pressure chamber varies at least generally proportionally with the pressure drop in said low pressure chamber through at least a substantial portion of the valve opening stroke of said valve element,
   wherein said regulating valve comprises three modular units one of which includes a diaphragm trapped between the other two units, and
   wherein the other two units each include a seal holder threaded into a bore in a valve body and an annular lip seal mounted in said holder in sliding contact with said valve element.

2. A regulating valve as recited in claim 1, wherein said seal holders are identical to one another and said lip seals are identical to one another.

3. A regulating valve comprising:
   (A) a housing in which is disposed a high pressure chamber, a balance control chamber in constant fluid communication with said high pressure chamber, and a low pressure chamber disposed between said high pressure chamber and said balance control chamber;
   (B) a valve seat which is disposed in said housing between said high pressure chamber and said low pressure chamber, said valve seat comprising an annular lip seal having an axially sealing surface and a radially sealing surface; and
   (C) a valve element which is disposed in said housing, said valve element comprising
      (1) a rod tower which, in response to a pressure drop in said low pressure chamber beneath a designated pressure, is movable axially within a valve body through a stroke that is at least generally proportional to the pressure drop in said low pressure chamber and which has an outer radial peripheral surface in sliding contact with said radially sealing surface of said lip seal, said rod tower being between 1) a fully closed position in which said rod tower seals against said radially sealing surface of said lip seal to prevent fluid flow from said high pressure chamber to said low pressure chamber, and 2) a fully open position in which a maximum inlet flow area of said valve element is open to permit fluid to flow from said high pressure chamber to said low pressure chamber at a maximum rate, and wherein, during said rod tower movement, a flow rate from said high pressure chamber to said low pressure chamber varies with the pressure drop in said low pressure chamber through at least a substantial portion of the opening stroke of said valve element, wherein said inlet flow area of said valve element increases continuously for at least a substantial portion of the opening stroke of said rod tower movement so that, through said substantial portion, the rate of fluid flow through said valve is at least generally proportional to the magnitude of said rod tower from said fully closed position, wherein said inlet flow area is defined by a plurality of pathways on said rod tower that have a combined cross sectional area that varies along an axial dimension of said rod tower, (2) a diaphragm to which said rod tower is connected and which flexes in response to pressure drops in said low pressure chamber to drive said rod tower to move relative to said valve seat from said fully closed position to said fully open position, and (3) a spring which biases said rod tower towards the fully-closed position thereof.

4. A regulating valve as defined in claim 3, wherein at least inlet ends of said pathways are tapered circumferentially and inclined relative to the axis of said rod tower.

5. A regulating valve as defined in claim 3, wherein:

(A) said regulating valve comprises three modular units one of which includes a diaphragm trapped between the other two units, wherein (B) the other two units each include a seal holder threaded into a bore in said valve body and an annular lip seal mounted in said seal holder in sliding contact with said valve element, and wherein (C) said seal holders are identical to one another and said lip seals are identical to one another.

6. A regulating valve as recited in claim 3, wherein said rod tower has a passage formed therethrough connecting said high pressure chamber to said balance control chamber.

7. A method of assembling a pressure regulating valve, comprising:

(A) providing a valve housing having a high pressure port, a low pressure port, and an interior; and (B) mounting a valve assembly in said interior of said valve housing so as to divide said valve housing into a high pressure chamber, a balance control chamber in constant fluid communication with said high pressure chamber, and a low pressure chamber disposed between said high pressure chamber and said balance control chamber, said valve assembly including first and second seal assemblies disposed in opposite end portions of said valve housing and being of identical construction.

8. A method as recited in claim 7, wherein each of said first and second seal assemblies comprises 1) a seal holder screwed into a threaded bore in said valve housing and 2) an annular ring seal retained in said valve housing by said seal holder, and wherein the mounting step comprises mounting identical ring seals in the associated seal holders in inverse orientations relative to one another.

9. A method as recited in claim 7, further comprising mounting a restrictor having a first coefficient of flow restriction in a low pressure port of a valve body and subsequently replacing said first restrictor with a second restrictor having a second coefficient of flow restriction.

10. A method as recited in claim 7, wherein the providing step comprising providing a valve housing formed from first and second housings sections screwed together with a valve element of said valve assembly clamped therebetween.

* * * * *